Figure 1:
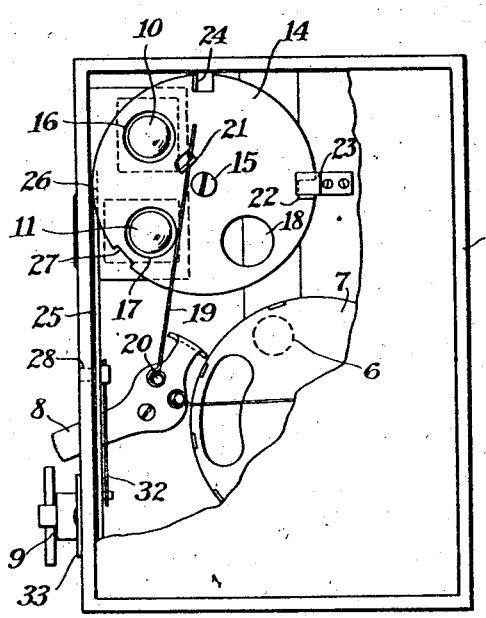

J. C. DENSE & W. F. VOCKROTH.
CAMERA.
APPLICATION FILED SEPT. 30, 1915.

1,200,174.

Patented Oct. 3, 1916.

Inventors:
John C. Dense
William F. Vockroth
by their attorneys
Davis & Dorsey

UNITED STATES PATENT OFFICE.

JOHN C. DENSE AND WILLIAM F. VOCKROTH, OF ELMIRA, NEW YORK.

CAMERA.

1,200,174.

Specification of Letters Patent.

Patented Oct. 3, 1916.

Application filed September 30, 1915. Serial No. 53,447.

*To all whom it may concern:*

Be it known that we, JOHN C. DENSE and WILLIAM F. VOCKROTH, citizens of the United States, and residents of Elmira, in the county of Chemung and State of New York, have invented certain new and useful Improvements in Cameras, of which the following is a specification.

This invention relates particularly to photographic cameras in which means are provided for changing the film, or other sensitized medium, after each exposure, by the operation of a winding-key or other manually-operable device, and particularly to cameras of the well known roll-film type.

In the use of such cameras double exposures are frequently produced, owing to carelessness on the part of the operator in forgetting to wind or change the film after the production of each exposure. Attempts have been made to avoid this result by providing automatic devices for indicating visually whether or not the film has been wound, but since the successful use of such devices depends upon the attention and observation of the user they do not completely and infallibly serve the intended purpose.

The object of the present invention is to provide a photographic camera with means which shall practically prohibit the production of a double exposure, notwithstanding the inadvertence or carelessness of the user, and to this end we propose to provide a camera with automatic means which render it practically impossible for the user of the camera to take a picture in the ordinary manner, unless the film has been wound or changed after the last preceding exposure.

Cameras of the portable type are universally provided with view-finding devices, and the use of such devices is practically essential to the production of a picture, and is therefore habitual with the users of such cameras. Accordingly, if the view-finder of a camera be rendered inoperative by any means, this will practically prohibit the production of a picture, or will, at least, render it impossible without notice of the condition of the finder on the part of the user. We take advantage of this fact, in providing against the production of double exposures, by employing automatic means which render the view-finder inoperative, these means being connected with and operated by the shutter-operating mechanism, so that, coincidentally with the production of each exposure, the finder is thrown into inoperative condition. In order that the operative condition of the finder may be restored, we employ manually-operable means for this purpose; and after the production of an exposure, if the operator attempts to take another picture, the inoperative condition of the finder prevents this until the manually-operable means have been used to restore the operative condition. The use of these means constitutes a reminder or notice of the necessity of winding or changing the film. In the preferred embodiment of the invention the manually-operable means for so restoring the operative condition of the finder are combined or associated with the means for winding or changing the film, so that the two operations are performed simultaneously, and no additional manual operations are imposed upon the user of the camera by the use of the present invention.

Figure 2:
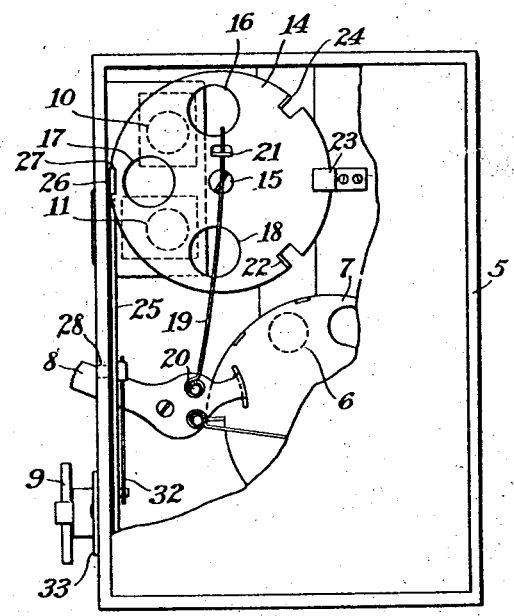
Figure 3:
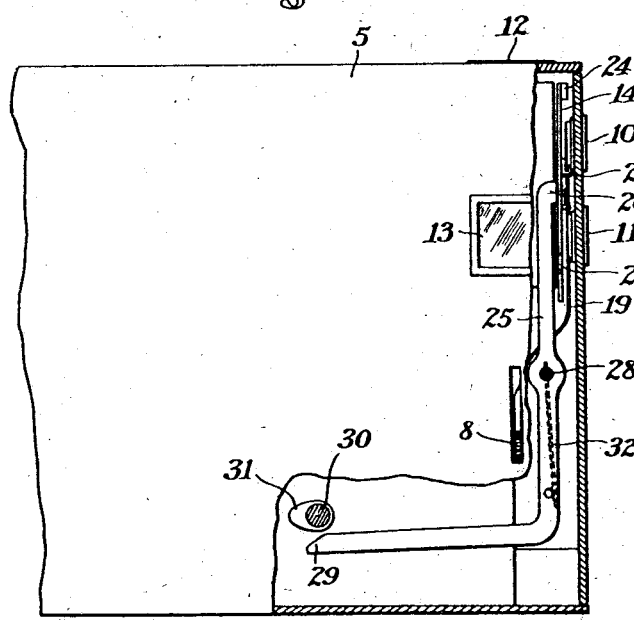
Figure 4:
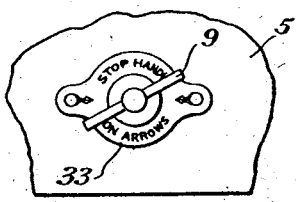

In the accompanying drawings:—Figure 1 is a front-elevation of a camera embodying the present invention, with a part of the front broken away to show the interior mechanism, the parts being shown in the position in which the finders are in inoperative condition; Fig. 2 is a view similar to Fig. 1, except that the finders are shown in inoperative condition; Fig. 3 is a side-elevation of the camera, with a part of the casing broken away, showing the parts in the same position as in Fig. 1; and Fig. 4 is a detail-view, in side-elevation, showing the key by which the film is wound and the finder is restored to operative condition.

The invention is illustrated as embodied in a camera of a well known box type, in which roll-film is employed. The camera has a rectangular box or casing 5 provided, at the front, with a lens 6 and a shutter 7. This shutter is of the well known rotary type, and is actuated, in opposite directions alternately, by an exposure-lever 8, an exposure being produced each time the lever is rocked from either of its two positions to the other.

The film-winding devices include a winding-key 9 which projects at the side of the camera, and these devices need not be further described, as they may be of any well known form.

The camera is shown as provided, in the usual manner, with two finders operable, respectively, from the top and the side of the camera, according as the length of the film is to be used vertically or horizontally. The upper finder has a lens 10 at the front of the camera, and the lower finder is provided with a lens 11. The finders are also provided with windows 12 and 13, respectively, in the top and one side of the camera-box.

While the finders may be rendered inoperative in various ways, the means preferably employed for this purpose, and illustrated in the drawings, are in the form of an obturator or shutter which is nearly similar, in its mode of operation, to a shutter of the well known rotary type previously used for controlling the exposure-opening of a camera. This obturator comprises a circular plate 14, which is mounted to turn on a pivot 15. The plate is provided with three openings 16, 17 and 18, and in one position of the plate, as shown in Fig. 1, the openings 16 and 17 lie in front of the lenses 10 and 11 of the two finders, while, in the opposite extreme position of the plate, the openings 17 and 18 lie in front of the lenses 10 and 11, respectively. The plate is actuated by means of a wire spring 19, which is mounted on a stud 20 projecting from the actuating-lever 8 of the shutter 7. This spring engages a lug 21 on the plate 14, and when the actuating-lever is swung to its lower position, as shown in Fig. 1, the spring tends to rock the plate 14 in a counter-clockwise direction, while an upward movement of the lever, to the position of Fig. 2, causes the spring 19 to tend to rock the plate in a clockwise direction.

The rotative movements of the plate 14 are limited by two stop-lugs 22 and 24, which coöperate with a fixed detent 23, and when either of the lugs 22 and 24 is in contact with the detent the plate 14 is in one of the two positions above described, in which the finder-lenses are not obscured. When the plate 14 is in an intermediate position, however, the lens 10 is obscured by the part of the plate lying between the holes 16 and 17, while the lens 11 is obscured by the part lying between the holes 17 and 18. This is the position of the parts shown in Fig. 2.

The plate 14 is automatically rested in the position of Fig. 2 by the action of a stop-lever 25. This lever has an extremity 26 which is adapted to engage a notch 27 in the edge of the plate. The lever 25 turns upon a stud 28, and a spring 32 tends to swing it in a direction to engage the notch 27. When the plate is in the position of Fig. 1, however, the extremity 26 of the lever rests against the rear surface of the plate, but when the operating-lever 8 is moved from one position to the other the resulting rotation of the plate 14 brings the notch 27 into registration with the stop-lever, whereupon the plate is arrested as in Fig. 2.

In order to release the stop-lever from the plate 14 its lower arm is arranged to coöperate with a part of the film-winding mechanism. The beveled extremity 29 of the lever is in position to be engaged by a cam 31, which is fixed on the stem 30 of the winding-key, as shown in Fig. 3. When this key is rotated, accordingly, the cam engages the stop-lever and swings it in a direction to release its extremity 26 from the notch 27, and thereupon, under the influence of the spring 19, the plate 14 continues its rotary movement until one or the other of the stop-lugs 22 and 24 is brought into engagement with the detent 23. In this manner the operative condition of the finders is restored.

In order that the stop-lever 25 may be effective to arrest the movement of the obturator-plate at each operation of the shutter, it is necessary to insure that after the operation of the winding-key, the key shall not be left in a position in which the cam 31 is in engagement with the stop-lever. For this purpose words and arrow-points may be stamped upon the escutcheon-plate of the winding-key, as shown in Fig. 4.

In the use of the camera above described a picture may be taken by using the finder and operating the shutter as usual. The operation of the shutter results in the assumption, by the obturator-plate, of its intermediate and operative position, as shown in Fig. 2. If, then, the user attempts to take another picture before winding the film, the attempt will be frustrated, by reason of the fact that the finder-lenses are obscured, and that the finders are therefore inoperative. The user of the camera will thereby be notified of the omission to wind the film, and will at once repair this omission, causing the obturator-plate to be released and to move to one or the other of its inoperative positions, according to the position which the shutter-operating lever 8 happens to occupy. The camera may then be used again in the ordinary manner.

While we have described particular means, in the form of an obturator, for rendering the finders inoperative upon the production of an exposure, and while we have shown our invention as embodied in a camera of a particular well known type, in which the film is changed by a winding operation, it will be apparent that the invention is not limited to the illustrated embodiment in these respects. It will also be apparent that, while the film-winding mechanism is conveniently employed as the manually-operable means for restoring the operative condition of the finders, this also is not an essential feature of the invention, but the invention may be embodied in various other forms within its nature as it is defined in the following claims.

We claim:—

1. In a camera, the combination, with shutter-mechanism and a view-finder, of means, actuated by said mechanism, for rendering the view-finder inoperative after the production of each exposure, and manually-operable means for restoring the operativeness of the view-finder.

2. In a camera having a view finder, a shutter mechanism and film winding mechanism, means actuated by the shutter mechanism for automatically rendering the view finder inoperative after each exposure, and means actuated by the film winding mechanism for restoring the operativeness of the view finder when said film winding mechanism is actuated.

3. In a camera having a view finder and a shutter mechanism, an obturator movable into and out of position to obscure said view finder, means actuated by said shutter mechanism for moving said obturator into obscuring position when said shutter mechanism is actuated to make an exposure, and manually operable means for moving said obturator out of obscuring position.

4. In a camera having a view finder, a shutter mechanism, and a film winding mechanism, an obturator movable into and out of position to obscure said view finder, means actuated by said shutter mechanism for moving said obturator into obscuring position, and means actuated by said film winding mechanism for moving said obturator out of obscuring position when said film winding mechanism is actuated.

JOHN C. DENSE.
WILLIAM F. VOCKROTH.